United States Patent [19]

Gross et al.

[11] Patent Number: 4,560,671

[45] Date of Patent: Dec. 24, 1985

[54] OLEFIN POLYMERIZATION CATALYSTS ADAPTED FOR GAS PHASE PROCESSES

[75] Inventors: Laurence H. Gross, Bridgewater; Allen Noshay, East Brunswick, both of N.J.

[73] Assignee: Union Carbide Corporation, Danbury, Conn.

[21] Appl. No.: 724,051

[22] Filed: Apr. 18, 1985

Related U.S. Application Data

[63] Continuation of Ser. No. 510,216, Jul. 1, 1983, abandoned.

[51] Int. Cl.[4] .............................. C08F 4/62; C08F 4/64; C08F 4/68
[52] U.S. Cl. ...................................... 502/105; 502/109; 502/118; 526/159
[58] Field of Search ........................ 502/105, 109, 118

[56] References Cited

U.S. PATENT DOCUMENTS

| | | | |
|---|---|---|---|
| 3,135,809 | 6/1964 | Bosmajian | 502/103 X |
| 3,179,604 | 4/1965 | Ingberman | 502/105 X |
| 3,278,510 | 10/1966 | Ingberman | 502/105 X |
| 3,293,229 | 12/1966 | Levine | 502/105 X |
| 3,990,993 | 11/1976 | Wristers | 502/109 |
| 4,220,555 | 9/1980 | Wristers et al. | 502/109 X |
| 4,224,185 | 9/1980 | Wristers | 502/105 |
| 4,272,405 | 6/1981 | Wristers | 502/109 |

*Primary Examiner*—Patrick P. Garvin
*Attorney, Agent, or Firm*—J. S. Piscitello

[57] ABSTRACT

Solid polyolefin catalysts are adapted for use in low pressure gas phase fluid bed polymerization processes by being mixed with selected particulate organic support materials in a high speed bladed finishing device so as to cause the catalysts materials to become embedded in, and/or adhered to, softened particles of the support material.

13 Claims, No Drawings

OLEFIN POLYMERIZATION CATALYSTS ADAPTED FOR GAS PHASE PROCESSES

This application is a continuation of prior U.S. application Ser. No. 510,216 Filing Date July 1, 1983 and now abandoned.

FIELD OF THE INVENTION

This invention relates to olefin polymerization catalysts that are adapted for use in low pressure gas phase polymerization processes. More particularly this invention relates to such catalysts as are adapted for use in low pressure gas phase fluidized bed olefin polymerization processes.

BACKGROUND OF THE INVENTION

Transition metal base olefin polymerization catalysts, when first developed, were employed under low pressure conditions in solvents or liquid diluents under solution or slurry polymerization process conditions. Later advances in the art of olefin polymerization technology allowed some of such catalysts to be used in low pressure gas phase processes which employed very little, if any, solvent or liquid diluent. In order to be used in such low pressure gas phase processes the various types of catalysts had to be adapted in various ways so as to allow them to function catalytically in a practical manner in these new processes. Although various catalyst modification techniques have been employed, such as the use of various types of supports, for facilitating the use of these catalysts in the various types of gas phase processes, it has been found necessary to further modify the known components of these catalyst systems to enable such catalyst systems to be used in a facile manner in fluidized bed processes in order to provide currently desired commercial results in the polymer products.

U.S. Pat. Nos. 4,048,415; 4,135,045 and 4,296,222 disclose that olefin polymerization catalyst components that may be used under low pressure conditions may be ball milled or micropolymerized to provide useful forms of transition metal based catalysts without the use of supports for the catalysts. U.S. Pat. No. 3,718,635 discloses the use of a ball milled supported low pressure olefin polymerization catalyst which has been supported on certain metal oxide supports. The catalysts of these patents are all intended to be used in the presence of inert solvent or liquid diluent.

Canadian Pat. No. 1,144,300 discloses the preparation of ball milled olefin polymerization catalysts in the presence of magnesium halide supports. Inorganic and organic diluents such as silica and polytheylene may be added during or after the ball milling step. These catalyst systems are intended for use in a low pressure gas phase fluidized bed process.

Catalyst systems prepared by these ball milling or micropulverizing procedures, with inorganic or organic support or diluent materials, however, have disadvantages with respect to the use of such catalyst systems in low pressure gas phase polymerization processes, and more particularly with respect to those catalyst systems that are to be used in a fluid bed process in that the morphology of these catalyst systems, i.e. their particle size and shape, makes them difficult to feed into the reactor in dry bulk form and also to fluidize them in the reactor. These feeding and fluidizing problems can lead to the formation of sheets and chunks of polymer in the reactor itself and/or in the gas recycle lines which can disrupt the continuous operation of the reactor due to the plugging of inlet, recycle, and outlet pipelines. The polymers produced with such catalysts are also likely to be of low bulk density due to an irregular particle shape and a relatively small particle size. These characteristics of such polymers can also contribute to the fouling of the reactor lines with sheets and/or chunks of polymer.

U.S. Pat. No. 3,515,684 discloses the preparation of fluidizable cracking catalysts by agglomerating, in a high speed bladed mixing device, very finely divided particles of a zeolite/water composition with an oily liquid. The resulting aggolomerated product is a dispersion, in oil, of zeolite particles of about 15–150 microns in size. These particles, however, have to be recovered from the oil and further processed before being used as catalyst materials in a cracking process.

U.S. Pat. No. Re. 28361 discloses the use of a high speed bladed finisher for the purposes of preparing masterbatchers of pigmented polymers, including polyethylene and polypropylene.

None of these references teach the use of a high speed bladed finishing device for the preparation of olefin polymerization catalysts that are particularly adapted for use in a low process gas phase polymerization process.

U.S. Pat. No. 3,990,993 discloses a process for depositing fine particle sized olefin polymer catalysts on web like submicroscopic fibrous structures of polymeric supports such as polytetrafluoroethylene and polyethylene, by the use of compressive shearing action in various types of mixing devices. No details are given with respect to the utility of such catalyst systems in a gas phase process. It would be expected that such supported catalyst systems would not be firmly supported on the polymeric webs and could be readily dislodged therefrom in a turbulent reaction medium such as in a gas fluidized bed process, and thus also produce operational problems due to polymer sheeting and chunking.

SUMMARY OF THE INVENTION

The object of the present invention is to provide a means for adapting solid high activity transition metal based olefin polymerization catalysts for use in gas fluidized bed polymerization processes.

In accordance with the present invention it has now been found that solid low pressure high activity transition metal based olefin polymerization catalyst precursors can be readily adapted for use in a gas phase polymerization process for the purposes of significantly improving the use of such catalysts for extended continuous periods of time in the reactors by mixing particles of the catalyst precursor with particles of an organic support material in a high speed bladed finishing device under such conditions as to cause the particulate support material to fuse and the particulate catalyst precursor to become embedded in the fused support materials.

DESCRIPTION OF THE PREFERRED EMBODIMENT

The Catalyst Components

The low pressure olefin polymerization catalyst systems for the present invention comprise a transition metal catalyst compound and an organometallic activating, or co-catalyst, compound. They may be more generally characterized as high activity Ziegler or Ziegler-Natta type catalyst systems.

By a "high activity" catalyst is meant either
- a Ziegler catalyst system which is capable of producing, in an aliphatic hydrocarbon solvent slurry, or liquid monomer solution, polymerization process, ethylene homo- and/or copolymers at a level of productivity of the order of at least 200,000, and preferably of at least 500,000, pounds of resin per pound of transition metal (in the catalyst employed), or
- a Ziegler-Natta sterospecific catalyst system which is capable of producing, in an aliphatic hydrocarbon solvent slurry, or liquid monomer solution, polymerization process, steroregular olefin polymers at a level of productivity of the order of at least 100,000, and preferably of at least 300,000, pounds of resin per pound of transition metal (in the catalyst employed).

By "stereospecific catalyst" it is meant a catalyst system adapted to produce steroregular polymers, that is, olefin polymers having an isotacticity of at least 80, and preferably of at least 90%.

The transition metal compound is a Group IVa, Va or VIa metal compound. The transition metals are preferably Ti, V, Zr and Hf. The preferred transition metal catayst compounds are the halides, more particularly the chlorides, oxyhalides and alcoholates of such compounds.

The compounds have the structure $$M(OR)_a X_b$$

wherein

M is Ti, V, Zr or Hf,

R is a $C_1$ to $C_{14}$ aliphatic or aromatic hydrocarbon radical, or COR' where R' is a $C_1$ to $C_{14}$ aliphatic or aromatic hydrocarbon radical, X is Cl, Br, I or mixtures thereof, a is 0 or 1, b is 2 to 4 inclusive and a+b is the valence of M and is usually 3 or 4 when M is Ti or V, and 4 when M is Zr or Hf.

The transition metal compounds can be used individually or in combinations thereof, and would include: $TiCl_3$, $VCl_3$, $TiCl_4$, $VCl_4$, $Ti(OCH_3)Cl_3$, $Ti(OC_6H_5)Cl_3$, $Ti(OCOCH_3)Cl_3$ and $Ti(OCOC_6H_5)Cl_3$, $ZrCl_4$ and $HfCl_4$.

These transition metal compounds may be used neat, where they are in solid form, or they may be converted to solid form by being complexed with support materials which form solid complexes with such transition metal compounds. Such complexing agents include Group IIa metal compounds, particularly those of magnesium such as MgO, $MgCl_2$, $MgBr_2$, $MgI_2$, MgOCl and mixtures thereof. Anhydrous $MgCl_2$ is the most preferred of such compounds.

The transition metal compounds, with or without the complexing support compounds, may also be used with an electron donor compound, which also forms a complex with the transition metal compounds. These electron donor compounds are known, as such, in the art, and also as Lewis Bases. They include esters, ethers, ketones, silanes and amines.

These esters, ethers, ketones, silanes and amines include such compounds as alkyl esters of aliphatic and aromatic carboxylic acids, aliphatic ethers and cyclic ethers, and aliphatic ketones. The silanes include polysiloxanes; alkoxy, aryloxy, alkylalkoxy and arylalkoxy silanes and halo derivatives of such silanes. The preferred silanes are phenyl trimethoxy silane and phenyl triethoxy silane. The amines include di- and polyamino compounds such as 1,2,4-trimethyl-piperazine; N,N,N',N'-tetramethyl-ethylene diamine, N,N,N',N'-tetraethyl-ethylene diamine; 2-dimethylamino-pyridine; N,N'-dimethyl-piperazine; orthophenylene-diamine; N,N'-dibenzyl-ethylenediamine; N,N',N"-dibenzyl-ethylenediamine; and 2,3,N,N'-dimethyl-naphthylenediamine. The preferred amines include N,N,N',N'-tetraethyl ethylene diamine. The preferable esters and ethers are alkyl esters of $C_1$ to $C_{10}$ saturated aliphatic carboxylic acids; alkyl esters of $C_7$ to $C_{15}$ aromatic carboxylic acids; $C_2$ to $C_8$, and preferably $C_3$ to $C_4$, aliphatic ethers, $C_3$ to $C_5$ cyclic ethers, and preferably $C_4$ cyclic mono- or di-ethers. The most preferred compounds would include ethyl anisate and tetrahydrofuran.

About 0 to 200, and preferably 10 to 80, mols of magnesium compound are used per mol of the complexes obtained by contacting the transition metal compound with the electron donor compound (hereinafter called ED compound).

About 0 to 3, and preferably 1 to 2, mols of ED compound are used per mol of transition metal compound.

The term "catalyst precursor" as used herein means the transition metal compound, alone, or in combination with the inorganic complexing type supports and/or the ED compound, but without either the organic supports discussed below, or a fully activating amount of the activator compound.

The level of productivity of these high activity catalysts is not significantly affected when these catalyst systems are modified as disclosed herein, for use in fluid bed olefin polymerization processes. Without the catalyst modification disclosed herein, however, these high activity catalysts could not be used to attain such levels of productivity in these gas phase processes without significantly adversely affecting the extended continuous operation of the reactors in which they are employed.

The activator compounds are preferably organometallic compounds of Group Ia, IIa or IIIa metals and more preferably of Al, Zn, Cd or Mg. The most preferred compounds have the structure $$Al(R'')_c X'_d H_e$$

wherein X' is Cl or OR''', R'' and R''' are the same or different and are $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$, $Al(C_2H_5)_2(OC_2H_5)$, $Zn(C_2H_5)_2$, $Cd(C_2H_5)$ and $Mg(C_2H_5)_2$.

About 10 to 400, and preferably about 50 to 150, mols of the activator compound are used per mol of the transition metal compound in activating the catalyst employed in the present invention.

Electron donor compounds, as described above, may also be used to form complexes with the activator compounds in order to enhance the stereospecificity of the Ziegler-Natta type sterospecific olefin polymerization catalysts. The elctron donors and activators, in such cases, would be used in an activator/electron donor mol ratio of about 0.5/1 to 20/1, and preferably of about 1/1 to 5/1.

The Organic Support Material

The organic support material used in preparing the catalyst systems of the present invention is a particulate polymeric hydrocarbon material. To facilitate its use in preparing the supported catalyst systems it should preferably have a melting point, or glass transition temperature, of about 70° to 170° C., and preferably of about 90° to 140° C., an average particle size of about 0.05 to 0.35 mm and a particle size distribution wherein not more than 10 weight % of the material has a particle size below 0.02 mm.

To facilitate the use of the supported catalyst system in a gas phase polymerization process, and more particularly in a fluidized gas phase process, the particulate support materials themselves, prior to having the catalyst precursor deposited or embedded thereon should preferably also have the following characteristics:

- a density of about 0.9 to 1.5 grams/cc,
- a bulk density of about 5 to 35, and preferably of about 15 to 35, lbs/ft$^3$, and
- an external void volume of about 0.8 to 5.0 cc/gram.

The external void volume is a measure of particle sphericity and packing efficiency.

Examples of polymeric organic support materials that may be used would include polyolefin resins, such as homo- and co-polymers of $C_2$–$C_8$ monoolefins and polyenes, such as polyethylene, polypropylene, polybutene, poly-(4-methyl-pentene), polystyrene and polydienes, and copolymers of ethylene and propylene with each other or with $C_4$–$C_8$ monoolefins and/or polyenes.

The organic support material must be chemically inert to all of the components of the polymerization reaction system in which it is used. About 60 to 95, and preferably about 65 to 90, weight % of the organic support is used with about 5 to 40, and preferably about 10 to 35, weight % of the transition metal based catalyst precursor, in preparing the supported compositions of the present invention.

Process for Making Supported Catalyst with Organic Support

The desired amounts of particulate organic support and particulate transition metal based precursor composition are fed all at once, or continuously and gradually over a period of time, to a bladed, high speed finishing device. The finisher is, essentially a horizontal cylindrically shaped mixing chamber having a mixing volume of about 1 to 150 liters, and has a motor driven shaft which extends the length of the chamber with a plurality of arms and scrapers attached thereto. About 4 to 20 arms may be attached to the shaft depending upon the length of the unit. Two sets of scrapers are normally used, one at each end of the shaft. The finisher may be water cooled, and is provided with a feeding port and discharging lines, usually working by gravity feed. The motor driven shaft and blades are capable of treating the charge of support and precursor materials at a blade tip speed of at least 150 to 750 inches/second, and preferably of at least 500 to 700 inches/second. The finisher can be operated in a batch or continuous mode of operation.

The particulate materials are thus mixed together for a time long enough, and at a temperature high enough, as to cause the particles of the organic support materials to soften and the particles of the catalyst precursor material to become embedded in, and/or adhered to, the softened support materials, but under such conditions of time and temperature as to avoid chemical decomposition of either of these particulate materials. The temperature employed in the mixing operation is that which is essentially caused by the heat of friction which is created during the mixing operation. The temperature must be controlled so as to avoid fusion between individual particles of the support material. No additional heat needs to be added to the composition being mixed, and cooling of the composition being mixed may be used to reduce the temperature generated. The temperature rise may also be controlled by regulating the tip speed of the blades which regulates frictional heating. The mixing of the two particulate materials is continued until a sticking efficiency of about at least 45 weight %, and preferably of about at least 75 to 90 weight % is achieved. This may take about 5 to 100 minutes depending on the size of the charge being treated. The term "sticking efficiency", as used herein, means the weight % of the total amount of the catalyst charge which is adhered to the support.

After the completion of the mixing operation the admixed particles are removed and cooled to room temperature. The resulting particles which have the precursor particles embedded in the support particles are substantially of the same size and shape as the original particles of the support particles.

Olefin Polymerization Process

Fluid bed reactors suitable for continuously preparing olefin polymers have been previously described and are well known in the art. Fluid bed reactors useful for this purpose are described. e.g., in U.S. Pat. Nos. 4,302,565 and 4,370,456, the disclosures of which are incorporated herein by reference. Said patents likewise disclose catalyst compositions suitable for preparing such polymers.

Hydrogen may be employed as a chain transfer agent to regulate the melt index of the polymers produced by the process. Generally, the reaction mixture contains hydrogen in an amount sufficient to produce a hydrogen to monomer mol ratio of from 0.01:1 to 0.5:1. In addition to hydrogen, other chain transfer agents may be employed to regulate the melt index of the polymers.

The gaseous reaction mixture should, of course, be substantially free of catalyst poisons, such as moisture, oxygen, carbon monoxide, carbon dioxide, acetylene and the like.

The polymerization process is usually conducted at temperatures of about 50° to 100° C., and preferably of about 70° to 90° C., and at pressures (as supplied by the feed of gaseous monomer and diluent) of about 100 to 400 psi, and preferably of about 150 to 300 psi. Since the polymerization reaction is exothermic, a heat exchanger in the gas recycle lines, or other means, is employed to remove excess heat of reaction.

In order to maintain a viable fluidized bed, the superficial gas velocity of the gaseous reaction mixture through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient.

If desired, the supported catalyst precursor composition may be partially activated before it is introduced into the polymerization reactor. The resulting product is a free-flowing solid particulate material which can be readily fed to the polymerization reactor where the activation is completed with additional activator compound which can be the same or a different activator compound.

Alternatively, the supported catalyst precursor composition may, if desired, be completely activated in the polymerization reactor without any prior activation outside of the reactor, in the manner described in U.S. Pat. No. 4,383,095, the disclosure of which is incorporated herein by reference.

The partially activated or totally unactivated supported catalyst precursor composition and the required amount of activator compound necessary to complete activation of the precursor composition are preferably fed to the reactor through separate feed lines. The activator compound may be sprayed into the reactor in the form of a solution thereof in a hydrocarbon solvent such as isopentane, hexane, or mineral oil. This solution usually contains from about 2 weight percent to about 30 weight percent of the activator compound. The activator compound is added to the reactor in such amounts as to provide, in the reactor, a total activator metal:transition metal molar ratio of from about 10:1 to about 400:1, preferably from about 50:1 to about 150:1.

In the continuous gas phase fluid bed process disclosed herein, discrete portions of the partially activated or totally unactivated supported catalyst precursor composition are continuously fed to the reactor, with discrete portions of the activator compound needed to complete the activation of the partially activated or totally unactivated precursor composition, during the continuing polymerization process in order to replace active catalyst sites that are expended during the course of the reaction.

By operating under the polymerization conditions and with the catalyst compositions described herein it is possible to continuously polymerize the olefin monomers, individually, or with each other, in a fluidized bed, to produce solid, particulate olefin polymers without undue reactor fouling. By "continuously polymerize" as used herein is meant the capability of uninterrupted polymerization for weeks at a time, i.e., at least in excess of 168 hours, and usually in excess of 1000 hours, without reactor fouling due to the production of large agglomerations of polymer.

The following Examples are designed to illustrate the compositions and process of the present invention and are not intended as a limitation upon the scope thereof.

The properties of the catalyst components used, and polymers produced, herein were determined by the following test methods:

Density: ASTM D 792—A plaque is made and conditioned for one hour at 100° C. to approach equilibrium crystallinity. Measurement for density is then made in a density gradient column.

Productivity: a sample of the resin product is ashed, and the weight % of ash is determined; since the ash is essentially composed of the catalyst, the productivity is thus the pounds of polymer produced per pound of total catalyst consumed. The amount of metals and halides in the ash are determined by elemental analysis.

Average Particle Size: This is calculated from sieve analysis data measured according to ASTM-D-1921 Method A using a 30 to 200 gram sample. Calculations are based on weight fractions retained on the screens.

Bulk Density: The resin is poured via a ⅜" diameter funnel into a 100 ml graduated cylinder to the 100 ml line without shaking the cylinder, and weighed by difference.

External Void Volume: A liquid imbibement technique is used to measure the internal void volume (IVV). The external void volume (EVV) is then calculated from the relationship:

EVV = (1/bulk density) − (1/resin density) − IVV

All references to "Groups" of metals made herein are references to metals grouped in accordance with the Mendeleeff Periodic Table of the Elements.

EXAMPLES

Catalyst Precursor Composition

The catalyst precursor composition employed in the Examples disclosed below was a ball milled composition having an average particle size in the range of about 2 to 50 microns. The precursor composition, when used with the activator compounds, was a high activity ethylene polymer catalyst. It was prepared from TiCl$_4$ as the transition metal compound, MgCl$_2$ as a complexing support, and tetrahydrofuran (THF) as a complexing electron donor, and in accordance with the procedures disclosed in Canadian Pat. No. 1,144,300, the disclosure of which is incorporated herein by reference. This precursor composition, chemically, conformed to a composition encompassed by the formula

Mg$_m$TiCl$_p$[THF]$_q$ wherein
m is ≧5 to ≦200
p is ≧13 to ≦403
and q is ≧0 to ≦3.0

Support Material

The support employed in these examples was a solid particulate high pressure low density polyethylene having a melting point of 95° C., a density of 0.93 grams/cc, a bulk density of 21.9 lbs/ft$^3$ and an external void volume of 1.39 cc/gram (with an internal void volume of 0.29 cc/gram). The particle size distribution of the particulate support was such that none of it was below 0.09 mm in size. It had a particle size range of 0.09 to 0.15 mm.

Finishing Operation

A charge of the catalyst precursor (70 grams; 35 weight %) and of the support (130 grams; 65 weight %) were charged, at about 25° C. and under an inert atmosphere of nitrogen, and in a batch mode of operation, to a 4" diameter by 6" long finisher having an internal capacity of about one liter. The finisher was closed and the shaft with four blades was started at 250 inches/second and the temperature of the admixed charge rose to 100° C. due to the intense agitation and heat of friction. The speed of the shaft was then lowered, after about 20 minutes to 210 inches/second in order to maintain the temperature of the admixed material at about 100° C. After finishing the charge at 100° C. for a total of thirty minutes, the shaft was stopped and the finished material was then discharged from the finisher. The resulting material was in the form of particles having an average particle size of about 100 microns. An electron Diffraction Spectroscopy (EDS) Cl mapping of the finished product indicated that each particle was essentially composed of a support kernel uniformly coated with the precursor composition.

Polymerization Reaction

A finished catalyst precursor prepared as described above was used in the terpolymerization of ethylene ($C_2$), propylene ($C_3$) and hexene-1 ($C_6$) in a gas fluidized bed process with the equipment basically disclosed in U.S. Pat. Nos. 4,359,561 and 4,363,904 and with a bed capacity of about 7 cubic feet. The reactor was operated at 85° C. and at a space time yield of 3.5 to 5.0, with 80–100 psi ethylene partial pressure, and a gas feed of $C_3$ and $C_6$ at a $C_2:C_3$ mol ratio of 16:1 and a $C_2:C_6$ mol ratio of 11:1. The activator compound used was triethyl aluminum and it was used at an Al:Ti mol ratio of 35 to 50. The activation was conducted in the reactor. The activator was fed to the reactor as a 5 weight % solution in a hydrocarbon diluent, at the rate of about 100 ml/hour.

Catalyst feeder and reactor operation were smooth and continuous as shown by the continuous operation of the reactor for ≧2 days without pluggage of the catalyst feeder or the formation of any discernible sheets or chunks of polymer therein. The polymer product was a terpolymer which had a density of 0.918 g/cc, a melt flow ratio of 48.0 and a bulk density of 17.6 lbs/ft$^3$. The polymer was recovered from the reactor at the rate of about 25 pounds per hour, and at a productivity level of about 1,000,000 pounds of polymer per pound of Ti in the catalyst.

Comparison Polymerization Reaction

The catalyst precursor, in unfinished unadapted form, was used in an attempt to produce an ethylene-butene-1 copolymer, at a $C_4/C_2$ ratio of 0.30 to 0.32, with a density of 0.918 to 0.922 g/cc, which is a much more simple polymerization process than the terpolymerization process in which the finished, adapted, precursor catalyst composition was used.

The reaction was attempted in a reactor system the same as that used for the terpolymerizaion reaction. The reactor was operated at 85° C. and at a space time yield of 2.3 to 5.3, with 200 psi total reactor pressure. The activator compound used was triethylaluminum, and it was used at an Al:Ti mol ratio of 65. The activation was conducted in the reactor. The activator was fed to the reactor, as a 10 weight % solution in a hydrocarbon diluent.

The reactor, however, had to be shut down after operating less than 24 hours. The operation was very unstable and resulted in the formation of skins and sheets of polymer on the walls of the reactor. This formation of skins and sheets was caused by the migration of the catalyst to the reactor walls and the formation there of catalyst rich molten polymer materials which assumed the form of skins, sheets and chunks. This unstable reactor operation was also characterized by the occurrence of large (~10° to 20° C.) temperature excursions (spikes) and chronic catalyst feeder pluggage problems.

We claim:
1. A multi-component Ziegler or Ziegler-Natta type high activity catalyst composition consisting of:
   (a) about 50 to 95 weight % of solid inert particulate organic support material having an average particle size of 0.05 to 0.35 mm, a melting point of about 70° to 170° C., and a density of about 0.9 to 1.5 grams/cc, and
   (b) about 5 to 50 weight % of solid particulate transition metal based low pressure olefin polymerization catalyst precursor, said particulate catalyst precursor being embedded in said particulate organic support material, and said catalyst composition having been formed by mixing said (a) and (b) components together in a high speed bladed finishing device.

2. A composition as in claim 1 in which said (a) support material is a polyolefin resin.

3. A composition as in claim 2 in which said (a) support material is a polyethylene resin.

4. A composition as in claim 2 in which said (a) support material is a polypropylene resin.

5. A composition as in claim 3 in which said (b) catalyst precursor is a Ziegler catalyst precursor.

6. A composition as in claim 4 in which said (b) catalyst precursor is a Ziegler-Natta stereospecific catalyst precursor.

7. A catalyst composition comprising
   (a) a catalytic precursor prepared according to claim 1, and
   (b) activating quantities of organometallic reducing agent compound.

8. A catalyst composition as in claim 7 in which
   said (a) precursor is based on a Group IVa, Va or VIa transition metal compound, and
   said (b) reducing agent is based on a Group Ia, IIa or IIIa metal compound.

9. A catalyst composition as in claim 8 in which said (b) and (a) compounds are used in an atomic ratio of about 10 to 400 based on the primary metal content of said compounds.

10. A process for preparing an olefin polymerization catalyst composition for use in a fluidized bed polymerization process which comprises mixing, in a high speed bladed finishing device
    (a) about 50 to 95 weight % of solid inert particulate organic support material having an average particle size of 0.05 to 0.35 mm, a melting point of about 70° to 170° C., and a density of about 0.9 to 1.5 grams/cc, and
    (b) about 5 to 50 weight % of solid particulate transition metal based low pressure olefin polymerization catalyst precursor which is a precursor of a high activity Ziegler or Ziegler-Natta type catalyst, said mixing being conducted under such friction induced heat conditions, and for a period of time, as are sufficient to cause the (a) particles of support material to soften, but not to fuse with each other, and the (b) particles of catalyst precursor to become embedded in and/or adhered to said (a) particles, without causing any deterioration in the chemical nature of either the (a) or (b) particles.

11. A process as in claim 10 in which said finishing device is operated at a blade tip speed of at least 150 inches/second.

12. A process as in claim 11 which is operated until a sticking efficiency of about at least 45 weight % is achieved.

13. A process as in claim 12 which is operated until a sticking efficiency of about at least 75 to 90 weight % is achieved.

* * * * *